US 8,856,861 B2

(12) United States Patent
Fahn et al.

(10) Patent No.: US 8,856,861 B2
(45) Date of Patent: Oct. 7, 2014

(54) GENERIC RIGHTS TOKEN AND DRM-RELATED SERVICE POINTERS IN A COMMON PROTECTED CONTENT FILE

(75) Inventors: Paul Fahn, Sunnyvale, CA (US); Sanjeev Verma, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1371 days.

(21) Appl. No.: 11/961,432

(22) Filed: Dec. 20, 2007

(65) Prior Publication Data

US 2009/0165080 A1    Jun. 25, 2009

(51) Int. Cl.
*H04L 29/06*    (2006.01)
*G06F 21/10*    (2013.01)
*G06F 21/31*    (2013.01)

(52) U.S. Cl.
CPC ........... *H04L 29/06* (2013.01); *H04L 2209/603* (2013.01); *H04N 2201/3246* (2013.01); *H04L 63/0263* (2013.01); *G06F 21/10* (2013.01); *G06F 21/31* (2013.01)
USPC ........... 726/1; 726/14; 726/6; 726/26; 726/27

(58) Field of Classification Search
USPC ........................................... 726/1
See application file for complete search history.

(56) References Cited

U.S. PATENT DOCUMENTS

| | | | | |
|---|---|---|---|---|
| 7,509,489 | B2 * | 3/2009 | Kostal et al. | 713/156 |
| 8,055,899 | B2 * | 11/2011 | Levy et al. | 713/176 |
| 8,364,720 | B2 * | 1/2013 | Levy | 707/803 |
| 8,577,795 | B2 * | 11/2013 | Clubb et al. | 705/39 |
| 2002/0052824 | A1 * | 5/2002 | Mahanti et al. | 705/37 |
| 2003/0105831 | A1 * | 6/2003 | O'Kane | 709/217 |
| 2004/0049694 | A1 * | 3/2004 | Candelore | 713/200 |
| 2004/0133622 | A1 * | 7/2004 | Clubb et al. | 709/200 |
| 2005/0091665 | A1 * | 4/2005 | Baird et al. | 719/315 |
| 2005/0278259 | A1 * | 12/2005 | Gunaseelan et al. | 705/59 |
| 2006/0020784 | A1 * | 1/2006 | Jonker et al. | 713/157 |
| 2006/0026588 | A1 * | 2/2006 | Illowsky et al. | 717/171 |

(Continued)

OTHER PUBLICATIONS

Chang et al., "A Switchable DRM Structure for Embedded Device", Nov. 26, 2007.*

(Continued)

*Primary Examiner* — Krista Zele
*Assistant Examiner* — Ondrej Vostal
(74) *Attorney, Agent, or Firm* — Kenneth L. Sherman, Esq.; Michael Zarrabian, Esq.; Sherman & Zarrabian LLP

(57) ABSTRACT

Methods and systems of rendering content on a device having a native digital rights management (DRM) system are described. A device, such as an end-user device capable of executing or playing content, acquires content in a common content format file having standardized locations for specific types of data. A generic digital rights token associated with the content is obtained by utilizing one of the standardized locations in the content format file, where the rights token contains information sufficient to allow retrieval of the rights associated with the content. Utilizing data in another of the standardized locations, it is then determined whether the device is registered in a domain. A license server directory may be accessed utilizing data in another of the standardized locations in the common content format file and a domain identifier, a device identifier, or both are transmitted to the license server directory. A native DRM system trigger is received and, upon activation of the trigger, a native DRM license is acquired, thereby enabling rendering of the content in the common content format file on the device.

15 Claims, 8 Drawing Sheets

(56) References Cited

U.S. PATENT DOCUMENTS

| | | | |
|---|---|---|---|
| 2006/0062426 A1* | 3/2006 | Levy et al. | 382/100 |
| 2006/0095458 A1* | 5/2006 | Siu et al. | 707/102 |
| 2006/0120522 A1* | 6/2006 | Clark et al. | 380/201 |
| 2006/0190290 A1* | 8/2006 | Gomez | 705/1 |
| 2006/0212580 A1* | 9/2006 | Wu | 709/227 |
| 2006/0242267 A1* | 10/2006 | Grossman | 709/218 |
| 2006/0242275 A1* | 10/2006 | Shapiro | 709/220 |
| 2007/0005506 A1* | 1/2007 | Candelore | 705/59 |
| 2007/0066341 A1* | 3/2007 | Silverbrook et al. | 455/550.1 |
| 2007/0078898 A1* | 4/2007 | Hayashi et al. | 707/104.1 |
| 2007/0122111 A1* | 5/2007 | Yamamoto et al. | 386/95 |
| 2007/0122676 A1* | 5/2007 | Song | 429/33 |
| 2007/0124249 A1* | 5/2007 | Aerrabotu et al. | 705/51 |
| 2007/0124252 A1* | 5/2007 | Higashi et al. | 705/59 |
| 2007/0162399 A1* | 7/2007 | Medvinsky et al. | 705/59 |
| 2007/0185814 A1* | 8/2007 | Boccon-Gibod et al. | 705/51 |
| 2008/0004904 A1* | 1/2008 | Tran | 705/2 |
| 2008/0005802 A1* | 1/2008 | Fierstein et al. | 726/27 |
| 2008/0010665 A1* | 1/2008 | Hinton et al. | 726/1 |
| 2008/0027869 A1* | 1/2008 | Kalker et al. | 705/59 |
| 2008/0082827 A1* | 4/2008 | Agrawal et al. | 713/176 |
| 2008/0086757 A1* | 4/2008 | Pestoni | 726/2 |
| 2008/0103923 A1* | 5/2008 | Rieck et al. | 705/26 |
| 2008/0109368 A1* | 5/2008 | Read et al. | 705/59 |
| 2008/0115225 A1* | 5/2008 | Jogand-Coulomb et al. | 726/27 |
| 2008/0140433 A1* | 6/2008 | Levy et al. | 705/1 |
| 2008/0177998 A1* | 7/2008 | Apsangi et al. | 713/155 |
| 2008/0183736 A1* | 7/2008 | Westerinen et al. | 707/101 |
| 2008/0189250 A1* | 8/2008 | Cha et al. | 707/3 |
| 2008/0195546 A1* | 8/2008 | Lilley | 705/59 |
| 2008/0249946 A1* | 10/2008 | Candelore | 705/59 |
| 2008/0250508 A1* | 10/2008 | Montague et al. | 726/28 |
| 2008/0313264 A1* | 12/2008 | Pestoni | 709/202 |
| 2009/0007240 A1* | 1/2009 | Vantalon et al. | 726/4 |
| 2009/0126027 A1* | 5/2009 | Lynch | 726/29 |
| 2009/0199230 A1* | 8/2009 | Kumar et al. | 725/32 |
| 2009/0222893 A1* | 9/2009 | Jeong et al. | 726/4 |
| 2009/0307387 A1* | 12/2009 | Jeong et al. | 710/33 |
| 2009/0313502 A1* | 12/2009 | Jeong et al. | 714/18 |
| 2009/0327137 A1* | 12/2009 | Raley et al. | 705/54 |

OTHER PUBLICATIONS

Nesi et al., "A Protection Processor for MPEG-21 Players", 2006.*
Prados et al., "Interoperability between different Rights Expression Languages and Protection Mechanisms", 2005.*
Wang, "MPEG-21 Rights Expression Language: Enabling Interoperable Digital Rights Management", 2004.*
Rump, "Can Digital Rights Management be Standardized?", 2004.*
Serrao et al., "Protecting Digital Music Delivery and Consumption using the OCCAMM Project Framework", 2002.*
Chiariglione, "Digital Rights Mangement, Interoperability and MPEG-21".*
Van Rijnsoever et al., "Interoperable Protection for Digital Multimedia Content", 2002.*
Kamperman, "Digital Rights Management Interoperability", 2007.*
MediaNet, "DRM System Architecture Specification for n-Services Delivery".*
Kalker et al., "The Coral DRM Interoperability Framework".*
Bellini et al., "MPEG-21 for the multi-format and multi-channel content production, protection and distribution".*
Gikas et al., "Digital Rights Management—A Standard in Flux", 2006.*
Serrao et al., "Interoperability Mechanisms for Registration and Authentication on Different Open DRM Platforms", 2006.*
Serrao et al., "From OPIMA to MPEG IPMP-X: A standard's history across R&D projects", 2005.*
Jamkhedkar et al., "Middleware Services for DRM", 2007.*
Ji et al., "MPEG-4 IPMP Extension for Interoperable Protection of Multimedia Content", 2004.*
Senoh et al., "DRM Renewability & Interoperability", 2004.*
ISO/IEC 14496-12:2005; International Organization for Standardization; http://www.iso.org/iso/catalogue_detail?csnumber=41828.

* cited by examiner

Rights Archive 130

| GRT (402) | Domain ID (404) | Content ID (406) |
|---|---|---|
| <actual token> | A | <ID of song, movie...> |
| ⋮ | ⋮ | ⋮ |

FIG. 4

Domain Manager 132

| Domain ID (502) | Device ID (504) |
|---|---|
| A | Device1 ID, Device2 ID, Device3 ID |
| B | Device4 ID, Device5 ID..... |
| ⋮ | |

FIG. 5

License Server Directory 128

| DRM ID | Native License Server |
|---|---|
| A | License Server x |
| A | License Server y |
| ⋮ | ⋮ |
| B | License Server m |
| | |

602 — DRM ID column, 604 — Native License Server column, 606 — rows indicator, 608 — rows indicator, 600 — table reference

FIG. 6A

License Server Directory 128

| Domain ID | Device ID | Content ID | Description of Rights |
|---|---|---|---|
| | | | |

612, 614, 616, 618 — column references; 610 — table reference

FIG. 6B

GRT 310

| Description of Content | Description of Rights |
|---|---|

702, 704 — column references

FIG. 7

GENERIC RIGHTS TOKEN AND DRM-RELATED SERVICE POINTERS IN A COMMON PROTECTED CONTENT FILE

BACKGROUND OF THE INVENTION

1. Field of the Invention

The present invention relates to computer networks and digital rights management. More specifically, it relates to sharing content on various devices and platforms having different digital rights management systems, in a network or domain.

2. Description of the Related Art

It is becoming increasingly common for users of a wide range of devices, ranging from MP3 players to hospital equipment, to want to share content with other users using different types of devices. The range of scenarios in which sharing or portability of content among devices in a defined domain or network is varied. One example is the home environment. In this domain, devices such as cell phones, MP3 players, PCs, and game consoles play different types of audio/visual or multimedia content. Family members in the home environment may want to play music that was originally downloaded and licensed for execution on an MP3 player on a cell phone or a PC instead. In another example, a family member who downloaded a movie onto a PC and obtained a license to play the movie on that PC may want to watch the movie on a cell phone in the home domain. Similar scenarios may occur in other settings, such as in a corporation or a hospital, in which media that was downloaded or installed on a specific device may need to be rendered or executed on another device within the same network or domain. For example, a doctor may want to play a clip of a medical video on her hand-held device that was originally downloaded onto a nurse's desktop workstation.

However, issues arise when users attempt to share content on different devices and platforms. In many cases it is not possible because of mismatches between digital rights management (DRM) systems associated with the content and DRM systems that are recognized by the devices. For example, if a song is downloaded onto an MP3 player, the user typically obtains a license token from the content provider to play that song on that MP3 player. If the user wants to play the song on a cell phone, the user must obtain a license allowing such usage. However, the cell phone and MP3 player typically have different native DRM systems. Thus, the DRM system on the cell phone would not know how to process or recognize the file representing the licensed song. Conflicts in DRM headers, methods of packaging content in a file format (e.g., different encryption schemes), metadata, and other factors, between the DRM system of the MP3 player and the DRM system of the cell phone would prevent sharing of the content.

The DRM system on one device does not how to read or open the license file for the content intended originally for a different DRM system. The format and encoding of the content file and the license are typically incompatible and foreign to one another, even if the content provider allows or has no legal objections to the content being rendered on different devices in the same domain. For example, the provider providing a song for an MP3 player may include in its license the right to the downloader to play the song on other devices in the user's same domain. Using the home environment as an example, the provider may not mind that the song be played by other household members on other devices in the home as long as one license is paid for by at least one member of the household. However, from a technical and DRM system standpoint, this is not always feasible. It may be possible with mapping of file formats or the establishment of secure communication channels (requiring some form of "handshake") within devices in a domain and obtaining licenses from different sources, but this is not a practical solution since it requires significant additional steps, both technical and legal, be taken by the users and imposes additional processing burdens on the devices.

SUMMARY OF THE INVENTION

In one embodiment of the invention, a method of rendering content on a device having a native digital rights management (DRM) system is described. A device, which may be an end-user device capable of executing or playing content, acquires content in a common content format file having standardized locations for specific types of data. A generic digital rights token associated with the content may be contained within the common content format file or may be obtained by utilizing one of the standardized locations in the content format file, where the rights token contains information sufficient to allow retrieval of the rights associated with the content. Utilizing data in another of the standardized locations, it is then determined whether the device is registered in a domain. A license server directory may be accessed utilizing data in another of the standardized locations in the common content format file and a domain identifier and a device identifier are transmitted to the license server directory. A native DRM system trigger is received and, upon activation of the trigger, a native DRM license is acquired, thereby enabling rendering of the content in the common content format file on the device.

Another embodiment of the invention is a digital rights management system having various components. A device in the system stores an interoperable domain client for enabling multiple DRM interoperability and also stores a native DRM client. The system also has a common content format file having a domain manager pointer, a license server directory pointer, and content protected using a native DRM. A rights archive has a generic rights storage area, a domain identifier storage area, and a content identifier storage area. A domain manager has a domain identifier storage area and a device identifier storage area. A license server directory has a DRM identifier storage area and a native license server identifier storage area that enables mapping of a DRM identifier with a native license server.

Another embodiment is a device, typically an end-user device, capable of rendering protected or licensed content. The device contains a common content format file having a generic rights token and the protected content, the content protected using a native digital rights management (DRM) system. The generic rights token and the content are stored in multiple standardized locations in the common content format file. Also included in the device is a native DRM system client software module that enables rendering of content using the native DRM system.

BRIEF DESCRIPTION OF THE DRAWINGS

References are made to the accompanying drawings, which form a part of the description and in which are shown, by way of illustration, particular embodiments:

FIG. 4 is a block diagram of a rights archive in accordance with one embodiment of the present invention;

FIG. 5 is a block diagram of a domain manager in accordance with one embodiment of the present invention;

FIGS. 6A and 6B are block diagrams of data stored in a license server directory in accordance with particular embodiments of the present invention;

FIG. 7 is a block diagram of a generic rights token in accordance with one embodiment of the present invention;

DETAILED DESCRIPTION OF THE INVENTION

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Methods, systems and interoperable architectures for enabling the sharing of various types of content on different devices within a domain, where the devices execute different or incompatible native DRM systems are described in the figures. The sharing of content and translation of rights among heterogeneous devices in a single domain is enabled using various network-wide services and a common file format. In this manner, movement of content in a domain is facilitated. In one embodiment of the present invention, licensed content is stored in a file having a well-defined and standardized format and structure that is recognizable to devices and that contains most or all the necessary information needed by the device to access network-wide services and to play or render the content. The file enables standardized location storage for storing content usage rights not specific to one DRM (i.e., a generic format). For example, content may be shared by transmitting it using e-mail. In this manner content may be shared among devices having different DRM systems without the need of establishing secure communication channels or having to obtain rights and rights metadata, such as data on parties, usages, payments, various content file formats from different sources. Nor does it require that the user be knowledgeable of different DRM systems and their functionality.

Figure 1:
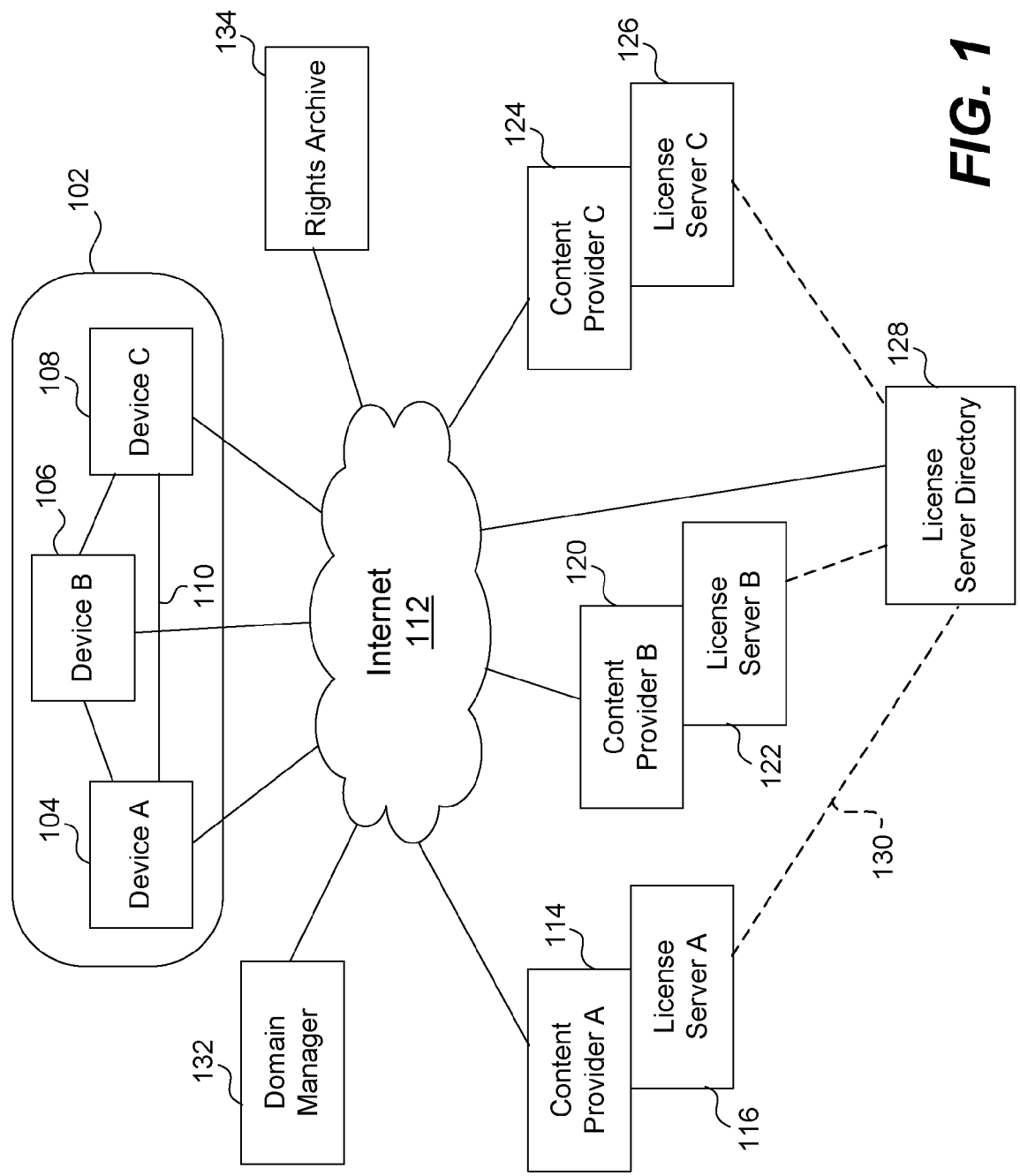
FIG. 1 is a network diagram showing components in an interoperable architecture for enabling the sharing of protected content rendered under different DRM systems on various devices in accordance with one embodiment of the present invention.

FIG. 1 is a network diagram showing components in an interoperable architecture for enabling the sharing of protected content rendered under different DRM systems on various devices in accordance with one embodiment of the present invention. An example domain 102 consists of three devices: device A 104, device B, 106, and device C 108. A domain may be a network of devices or, more generally, an environment of one or more users having devices which may or may not be connected in a physical network under one or more protocols, such as a LAN, Ethernet, WAN, and the like. A domain, for example, may be a household, a company, a hospital, a government agency, a school, and so on, and devices therein. Or a domain may consist of an individual and that person's devices. Users in the domain have computing devices, many of them having Internet connectivity, although it is not required, that run on different platforms, come from different manufacturers, use incompatible protocols and standards, and the like. They are capable of rendering or playing one or more types of audio/visual or multimedia content and have native DRM systems that regulate the accessibility of this content on any device. DRM code, typically associated with content and with a device, allows a device to play a piece of content based on a DRM-specific description of rights contained in a license (or license token) obtained by the user/device from a license server, typically under control of a content provider (or asset management system) to play that piece of content. A content provider may be an ISP, on online retailer (e.g., Amazon.com) or a telecom. DRM systems may be described as access control techniques by publishers and copyright holders to place restrictions associated with instances of digital works. DRM systems typically start with a content provider encoding the content into a format supported by DRM software, where the format depends on the software vendor. Examples include Microsoft Windows DRM, Apple FairPlay OMA DRM, and others. Various types of content are protected, mostly movies and music, but TV content, eBooks, audio books, short videos, and so on may also be included. License rights may include information such as validity dates (e.g., license runs until such date or after such date), number of users, ability to print, cut/copy, etc.

There is a wide range of different environments, devices, and types of content to which embodiments of the present invention may be applied. One example of domain 102 and devices operating within it is a household, where users are family members. Device A 104 may be an MP3 player, device B 106 may be a cell phone, and device C 106 may be a PC. These devices may all operate using different software, protocols, operating systems, and, specifically, DRM systems. For example, the DRM system for Apple's iTunes, FairPlay, is not the same as Microsoft's Windows DRM, which is different from OMA DRM, and so on. For example, headers in the DRM systems are generally incompatible, among other aspects of each system. In one embodiment it is not required that these devices be connected in a physical wired or wireless network. Using the home environment as an example, the devices do not need to be in a home network or be connected to a home network server. However, having these devices connected in such a manner, for example, as connection 110 in FIG. 1, does not hinder implementation of embodiments of the present invention.

Another perspective of domain 102 is that it is an environment in which a content provider, given the appropriate licensing terms, would be willing to allow users or a single user to share content only on devices restricted to that domain. In the home environment example, a content provider may provide a license to a family member who bought or downloaded a song for playing on a PC or MP3 player to share that song with another family member who wants to play that song on her cell phone. In another example, a content provider may allow a single user to share content on the user's own devices. The content provider may allow this type of sharing of its licensed content as long as the content is shared on devices in a defined domain. However, as noted above, this type of sharing may not be technically feasible among certain types of devices that have different DRM systems and where the content to be shared is restricted to one native DRM system.

In one embodiment, devices A, B, and C are each connected to Internet 112. Depending on the domain, some of these devices may share the same means for Internet connectivity or they may have their own dedicated connection. For example, a cell phone in a house may have its own connection whereas a laptop computer, a PDA, and a game console may share the same connection, such as a DSL or cable modem. As noted above, the devices do not need to be connected to one another in order to share protected content.

There are various network services (described below) connected to devices A, B, and C in domain 102 via Internet 112 and content providers, such as content provider 114, content provider 120, and content provider 124. In one embodiment, a content provider may be an entity that makes content available to end users (the content itself is typically created by a separate content creator, such as a movie studio, a record company, independent film makers, authors, publishers, and so on). Content providers 114, 120, and 124 may be ISPs or telecom companies that provide Internet connectivity to devices in a domain. In other embodiments, other entities may act as content providers, such as online retailers, market makers (Amazon, eBay, etc.) the actual content creators, distribution companies (including movie studios), licensing companies, (e.g., BMI, ASCAP, etc.) and so on.

A content provider may have an associated license server, shown as license server 116, license server 122, and license server 126. In one embodiment, these servers may be integrated with their respective content provider servers, as shown in FIG. 1. In other embodiments, the license servers may be at other locations (e.g., at a third party that manages license servers for small-scale content providers) and there may be more than one license server for a single content provider. Some larger content providers may have multiple license servers. License servers 116, 122, and 126 each store and manage licenses (e.g., the distribution of license tokens) for a content provider in a native DRM system, that is, a DRM system that is associated with the content and with the device that will be rendering the content.

A license server directory 128, also connected to Internet 112, is in communication with license servers 116, 122, and 126. In one embodiment, communication is via Internet 112 rather than through direct communication links. Thus, connections shown in FIG. 1 are dashed lines (such as line 130). However, in some embodiments, there may be direct connections between a license server and license server directory 128. In one embodiment, license server directory 128 is operated by a third-party service provider offering services to enable the multiple DRM system architecture of the present invention. This service provider may be a device manufacturer, a home network component manufacturer, or any entity wanting to promote the sharing of protected content among devices having different DRMs.

In one embodiment a generic rights token ("GRT"), described below, is stored in or accessed through a common protected content format ("CPCF") file that enables DRM interoperability among devices in a domain. That is, a device in a DRM may have software or firmware that recognizes a CPCF file and its contents, and enables the device to ultimately obtain permission to render the content in a native format using a native DRM system on the device. As described in one embodiment, a CPCF file may be based on ISO Based Media File Format (ISO 14496-12), the content of which is incorporated by reference herein in its entirety and for all purposes.

Also shown in FIG. 1 are a domain manager 132 and a rights archive 134. Domain manager 132 stores and manages a list of domains that have registered to use the interoperable architecture, CPCF, GRT, and other services of the present invention. Domain manager 132 is described in greater detail in FIG. 5. In one embodiment, rights archive 134 stores GRTs and other rights information, such as rights metadata, that may be needed for implementing the DRM interoperability methods of the present invention. Rights archive 134 is described in greater detail in FIG. 4 below. These services may also be provided by the third-party service provider.

Figure 2:
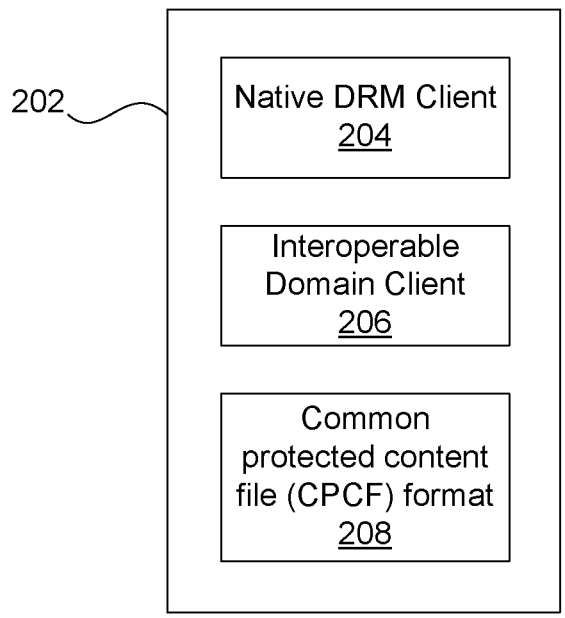
FIG. 2 is a block diagram showing software modules and data components that may execute and are accessed on an end-user device that may be needed for implementing the DRM interoperability functions in accordance with one embodiment of the present invention.

FIG. 2 is a block diagram showing software modules and data components that may execute and may be accessed on an end-user device that may be needed for implementing the DRM interoperability functions in accordance with one embodiment of the present invention. An example device 202, such as device 104, 106, or 108 in FIG. 1 may be one of various manifestations ranging from consumer devices (cell phones, MP3 players, PCs, PDAs, etc.) to more specialized devices for use in specific environments or domains, such as hospitals, clinics, corporations, government agencies, educational institutions, and so on. It is expected that a common facet of these devices is the ability to render or present to a user some type of audio/visual content, multimedia content, or any type of content (e.g., plain text in an eBook) that comes under the purview of a DRM system. The devices described here may be manufactured by numerous manufacturers, including the third-party service provider operating the network services described above.

Shown in device 202 are a native DRM client 204, an interoperable domain client ("IDC") 206, and CPCF file 208. There may be numerous other software modules, clients, files, and the like on device 202 that are not shown in FIG. 2. Native DRM client 204 is software on device 202 for processing data that device 202 receives in a native DRM format.

Figure 3A:
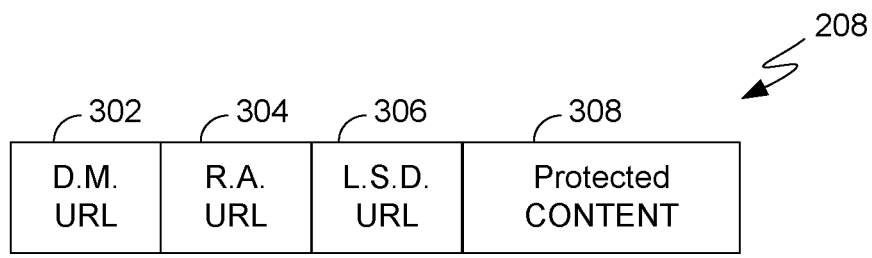
FIGS. 3A and 3B are file format diagrams showing formats of a common protected content format file in accordance with various embodiments of the present invention.
Figure 3B:
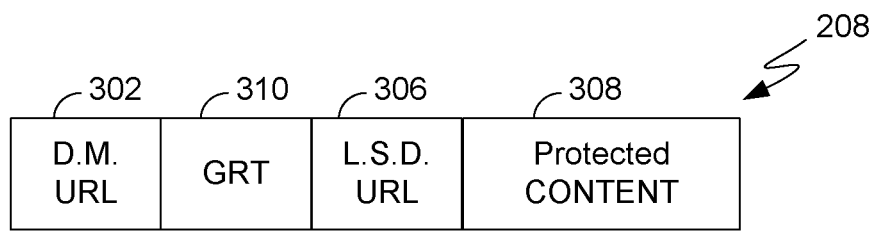

IDC 206 is software that a device may use to process CPCF file 208 (described in FIGS. 3A and 3B). In one embodiment, IDC 206 is installed on device 202 by the device manufacturer or by an entity that provides the software and firmware for the device, such as the third-party service provider described above. In this scenario the device may be said to be "IDC-ready" or "Multi-DRM ready" when purchased by the consumer and may be used as a technical feature when selling the device. For example, if the device is an iPod equipped with IDC 206, it will play MP3 files from the iTunes online store and may also play MP3 files from the Zune (Microsoft) online store. In another embodiment, IDC 206 may be downloaded from the third-party service provider Web site by the consumer onto device 202 after purchasing the device, in which case the device may be referred to as "IDC-capable," "Multi-DRM capable," or the like.

IDC 206 operates on CPCF file 208 which contains various pointers to network-wide resources, such as domain manager 132, rights archive 134, and license server directory 128, that may be needed for implementing multiple DRM functionality. As noted, IDC 206 may be developed by a third-party service provider with the goal of promoting the multiple DRM interoperable architecture of the present invention. In other embodiments, it may be developed by one or more standard-setting bodies such as Coral or the Digital Living Network Alliance (DLNA), or by cooperation between these standards bodies and the third-party service provider, which may also be a device manufacturer.

FIGS. 3A and 3B are file format diagrams showing formats of CPCF file 208 in accordance with various embodiments of the present invention. In one embodiment, file 208 has various fields including a domain manager pointer field 302, a rights archive pointer field 304, and a license server directory pointer field 306. In one embodiment, these fields contain URLs (as shown in FIGS. 3A and 3B) to the various network components described in FIG. 1. In other embodiments, other software devices may be used to point or direct device 202 via IDC 206 to these components. Methods used by device 202 and IDC 206 to access data in domain manager 132, rights archive 134, and license manger 128 are described below.

CPCF file 208 may also have a field 308 for storing the actual protected content. In another embodiment of CPCF file 208 shown in FIG. 3B, instead of rights archive pointer field 304, there is a GRT field 310 which stores the generic rights token of the present invention needed by device 202 to play the content, as further described in the figures below. The concept of using CPCF file 208 which has standard locations for the pointers and content may be promoted and supported by the third-party service provider for use by content providers who want to offer protected content that can be shared by devices in a multiple-DRM environment.

FIG. 4 is a block diagram of rights archive 130 in accordance with one embodiment of the present invention. In one embodiment, rights archive 130 is implemented as a server having a GRT field 402 containing information sufficient to allow retrieval of rights associated with the content for a user in a domain. Rights archive 130 may also have a domain ID field 404 storing unique identifiers of domains participating in the DRM interoperable architecture of the present invention. A content identifier field 406 contains a suitable identifier of the various types of content. These identifiers may vary based on the type of content such as music (MP3, wave files, etc.), motion pictures, digital videos, Flash content, text, among many other formats. In one embodiment, rights archive 130 is under control of the third-party service provider.

FIG. 5 is a block diagram of domain manager 132 in accordance with one embodiment of the present invention. A domain identifier field 502 stores domain identifiers and is similar or identical to domain ID field 404. Associated with a domain is a list of devices (or a single device) which is shown in a device identifier field 504. In one embodiment, domain manager 132 assigns identifiers to devices when the device registers with domain manager 132. In another embodiment, an identifier of the device, such as a serial number or similar identifier may be used. As described below, when a domain is created or when a new device is registered in a domain, the third-party service provider may perform the necessary operations on domain manager 132. In other embodiment, this responsibility may be shared by various entities supporting the interoperable DRM system of the present invention.

FIGS. 6A and 6B are block diagrams of data stored in license server directory 128 in accordance with particular embodiments of the present invention. In one embodiment, a storage area 600 has a DRM system identifier (DRM ID) field 602 and a native license server identifier field 604. DRM ID field 602 stores unique identifiers in storage area 606 for each DRM system registered in the interoperable architecture network. A schema for naming DRM systems may be derived by the third-party service provider described above, a telecom, or other participating entity (DRM systems may have an identifier that may not necessarily conform to a standard naming convention for DRM systems). A DRM system may have one or more native license servers as provided for in storage area 608. As shown in the example of FIG. 6A, DRM system A has at least two license servers, X and Y. As described below, the portion of license server directory 128 described above, maps DRM IDs to each DRM's native license server.

In another embodiment, license server directory 128 also has a storage area 610 that contains various types of data that may be used to map a GRT to a native (non-generic) license token. A domain ID field 612 stores an identifier of a domain as described above in FIGS. 4 and 5. Similarly, device ID field 614 stores an identifier for a registered device in a particular domain. A content ID field 616 stores a unique identifier of the protected content. In one embodiment, field 616 may contain non-uniform identifiers given that protected content (e.g., movies, music, etc.) from different sources may have different naming or identification protocols. In another embodiment, a uniform and unique identifier is assigned to each content entered into the multiple-DRM interoperable system of the present invention. A description of rights field 618 stores rights and rights metadata attached to the content and may be stored in various forms, such as plain text, or in a more structured format. A description of rights contains information on the licensing rights attached to the content and to the user that may include, for example, the number of times the content may be played, whether it can be copied, cut and pasted, the number of devices on which it may be played, validity dates, whether the license is exclusive or non-exclusive, whether sub-licensing is permitted, licensor and licensee information, and so on. Many other types of data may be included as is known in the field of licensing of digital content. In other embodiments, description of rights field 618 may contain a GRT if the GRT is not included in CPCF file 208. As with the other network services, license server directory 128 may be created, maintained, and controlled by the third-party service provider with the goal of promoting and managing the DRM interoperable architecture of the present invention.

FIG. 7 is a block diagram of a GRT in accordance with one embodiment of the present invention. A GRT, for example, may have a content description field 702 and a generic rights description field 704. Rights description field 704 may contain similar information stored in field 618, that is, general licensing rights information and rights metadata. Description of content field 702 may store a narrative description of the content, the content ID, or combinations thereof, as described above for field 616.

Figure 8:
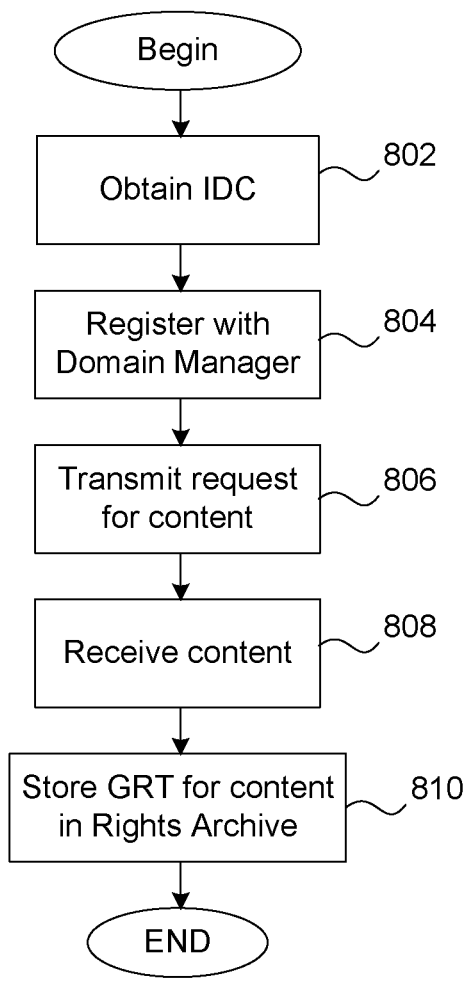
FIG. 8 is a flow diagram of a process for registering a new device in a domain in accordance with described embodiments of the present invention.

FIG. 8 is a flow diagram of a process for registering a new device in a domain in accordance with described embodiments of the present invention. At step 802 IDC 206 is obtained for a new device if the device is not pre-configured by the manufacturer or re-seller with an IDC or similar software. IDC 206 performs various functions, including processing of CPCF file 208 and, specifically, the retrieval and transmission of DRM and GRT-related information from the network services described in FIG. 1. It can be described as the client device software for enabling the interoperable DRM architecture of the present invention. IDC 206 or similar software may be developed by the third-party service provider wanting to promote and offer an interoperable architecture for DRM systems, an ISP, an online retailer, a telecom, or other software developer in the field of DRM systems. In other embodiments, IDC 206 may also be developed by device manufacturers in accordance with standards and protocols set by the third-party service provider or other entities, such as standard setting bodies.

At step 804 the user of a new device registers the device with a domain manager. By doing so, the new device is a recognized and registered device in one or more specific domains, such as a household, hospital, corporation, or other environment or a domain comprised of only of an individual's devices. By registering the device in a domain, the device may be accorded rights that the domain itself is entitled to. Upon registering the device, domain manager 132 has data associated with the device. The user may have to provide the name of the domain. This name or identifier may be a user friendly name, such as "Robertson Household" or "Uptown Pediatric Clinic" and the like, or a more technical network identifier. Although beyond the scope of the present invention, a domain may be created and defined by any individual (a family member, an IT professional, etc.) by contacting the third-party service provider, ISP, or other responsible entity. A device is also assigned a device ID by the service provider or other entity and is stored in device ID field 504 for a corresponding domain ID stored in field 502.

At step 806 the device transmits a request for content to a content provider over a network, typically the Internet. In the request, the device may include its device ID and a domain ID. In other embodiments, only the device ID may be inserted or only the domain ID. The request is sent to a content provider, such as an ISP, an online retailer of music, movies, video, text, and so on. In one embodiment, only content providers participating in the multi-DRM interoperable architecture of the present invention may receive requests with domain and/or device IDs. It is only in this context that a domain ID, for example, may have a meaningful role.

At step 808 the device receives content from the content provider. In one embodiment content is transmitted as part of a CPCF file, in which the content is protected under a DRM system. As noted, content providers participating in the multiple-DRM system may agree to distribute their content in this special type of file to end users. In one embodiment, a CPCF file itself contains a description of rights relating to the content in GRT field 310 (as shown in FIG. 3B) or has a pointer or URL to rights archive 134 which stores the GRT or information sufficient to allow retrieval of the rights related to the content. In one embodiment, at step 810 the content provider stores a GRT for the content that has been requested in rights archive 134. In another embodiment, a description of the rights associated with the content is stored in archive 134 without the use of GRT 310. At this stage, the process of registering a device and requesting content for the device while updating data network-wide services is complete.

Figure 9:
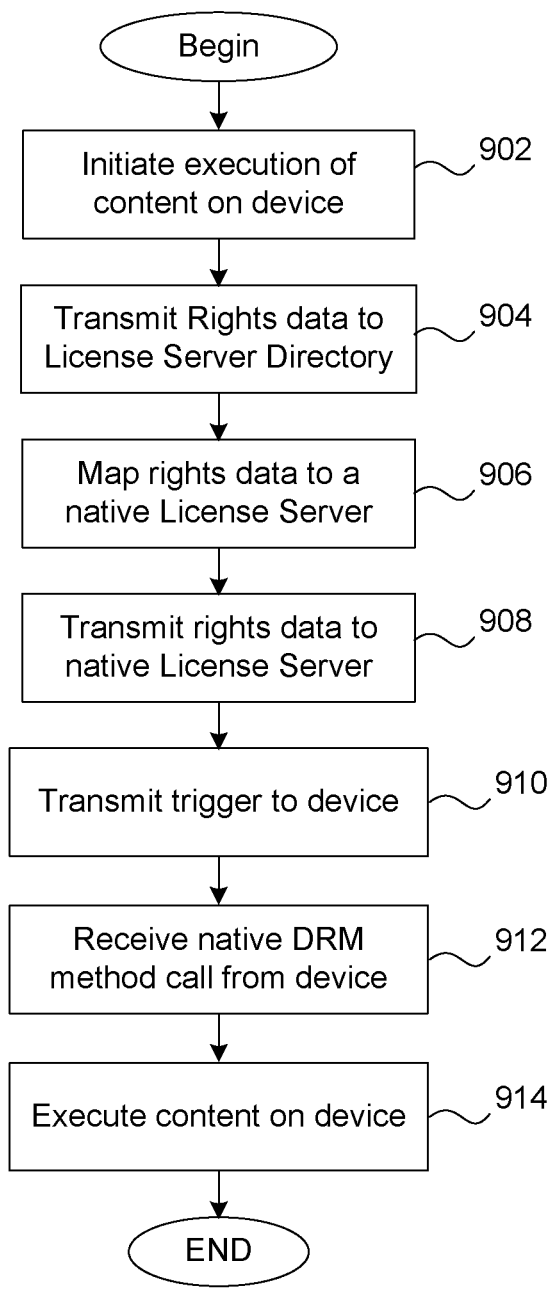
FIG. 9 is a flow diagram of a process of rendering or executing content on a device in accordance with particular embodiments of the present invention.

FIG. 9 is a flow diagram of a process of rendering or executing content on a device in accordance with particular embodiments of the present invention. At step 902 the user initiates execution of the content on the device, for example, by pressing a PLAY button or by opening a file. By initiating execution or playback, a rights verification and acquisition process begins. At step 904 IDC 206 or other suitable software on the device transmits rights data related to the content to license server directory 128. As described above, the rights data are contained in CPCF file either in the form of a GRT (stored in GRT field 310 in FIG. 3B) or as a pointer or URL (field 304) to an entry in rights archive 134 where it may be stored in the form of text, a database record, and the like. In another embodiment, rights data may be stored in CPCF file 208 as it is stored in rights archive 134. In another embodiment, a GRT may be stored in the same format in CPCF file 208 and a description of rights may also be stored in rights archive 134.

At step 906 the rights data are used to determine the identity of a native license server. For example, the DRM system identifier in the rights data (or which is sent with the rights data at step 904) may be used in table 600 in FIG. 6A to map to a native license server in column 604 and storage area 608. If there is more than one native license server that corresponds to a DRM ID, more specific information in the rights data (or metadata) may be used to identify a specific native license server from multiple license servers that services the DRM system.

Once a native license server is identified at step 906, at step 908 the rights data are transmitted to native license server for the specific DRM. In another embodiment the GRT is transmitted to the license server. Native license servers, as shown initially in FIG. 1, are normally under the control of a content provider or a specific DRM system manager (not shown in FIG. 1). If the rights data received at the native license server are authenticated and the license server concludes that the device is, in fact, entitled to play or execute the content, at step 910 the native license server transmits a trigger or other callback mechanism to the device. For example, such a trigger may be a simple user interface icon or button that states something similar to "Press here to play," "Click here to begin movie," or "Your music is ready" that the user must press or activate. In one embodiment, responding to the trigger is a second step taken by the user to begin actual execution or rendering of the content (the first step taken by the user was at step 902).

At step 912 the native license server receives a native DRM method call from native DRM client 204 on the device after the user activates the trigger from the server sent in the previous step. The process of creating and transmitting a native DRM method call from a device to a corresponding native license server may be performed following native DRM-specific procedures (e.g., steps normally taken by a device in a non-multiple DRM environment). At step 914 the content executes on the device according to the digital rights associated with the content the user and device, and the process is complete.

Figure 10:
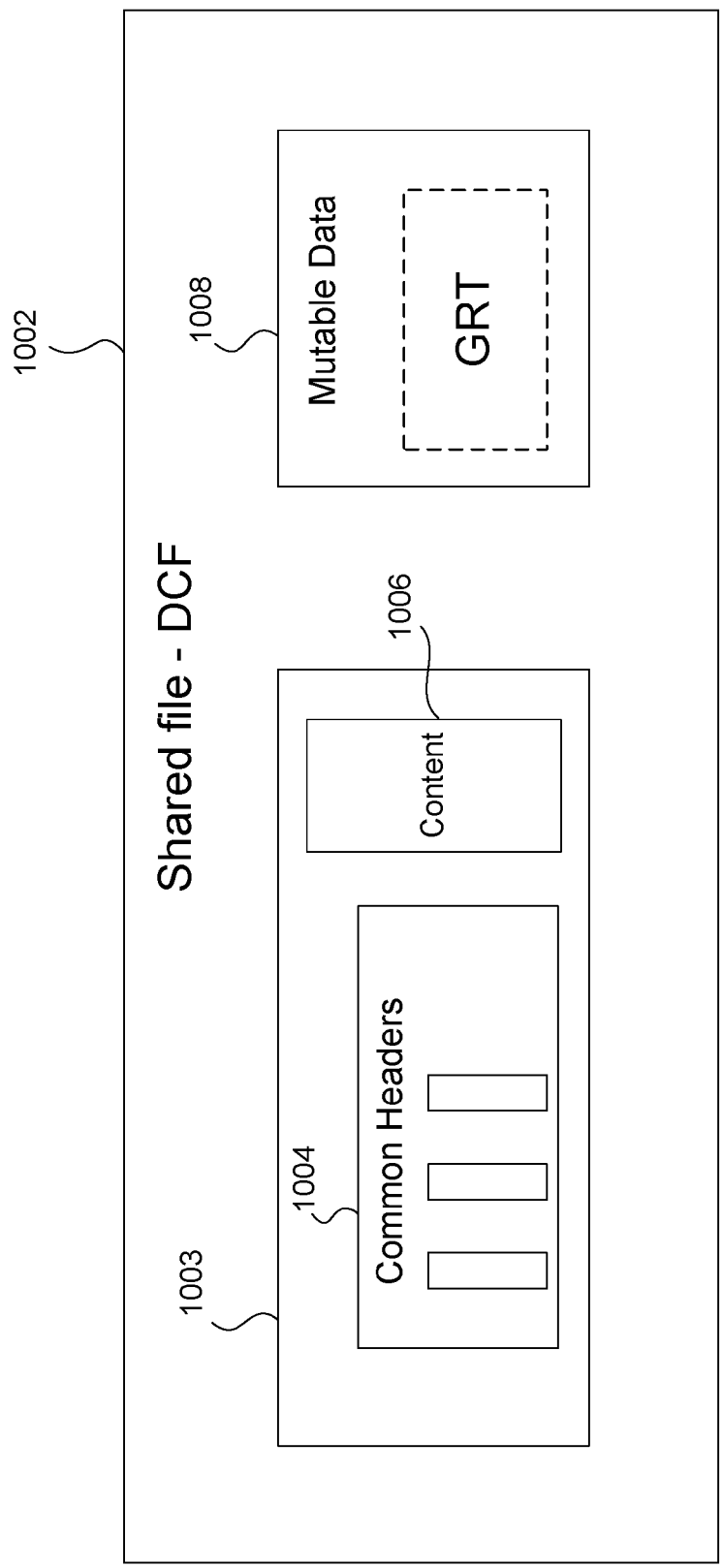
FIG. 10 is a block diagram showing an example embodiment of a common protected content format file using a shared file-DCF.

FIG. 10 is a block diagram showing an example embodiment of CPCF file 208 using a shared file-DCF (Distributed Coordination Function). A shared file-DCF 1002 has various storage areas that are well-suited to accommodate the pointers, URLs, data, and content described above. As noted, CPCF file 208 may be implemented using any suitable existing file type or may be implemented by the third-party service provider using a new file type having fields shown in FIGS. 3A and 3B at standardized storage locations. Regardless of what type of file is used to implement file 208, the location of the pointers, data (e.g., rights descriptions, rights metadata, GRTs), and content should be standardized, consistent, and reliable. IDC 206 (or, more generally, the device) knows exactly where to find pointers to the network components and services it may need, and the pointers and other data are preferably in the same file (or in close proximity) to facilitate access.

In file 1002, an area called Shared Discrete Headers area 1003 has a Common Headers storage area 1004 in which pointers to various network services described above for enabling interoperability are stored. Common Headers area 1004 is well suited for storing the pointers because of the compactness and close proximity of the storage areas. A storage area 1006 may be used for storing the protected content. The storage capacity of area 1006 may vary as needed based on the type of content. A mutable information area 1008 may store a GRT or some type of description of the rights associated with the protected content. In another embodiment, CPCF may be implemented as a packetized DCF.

Figure 11:
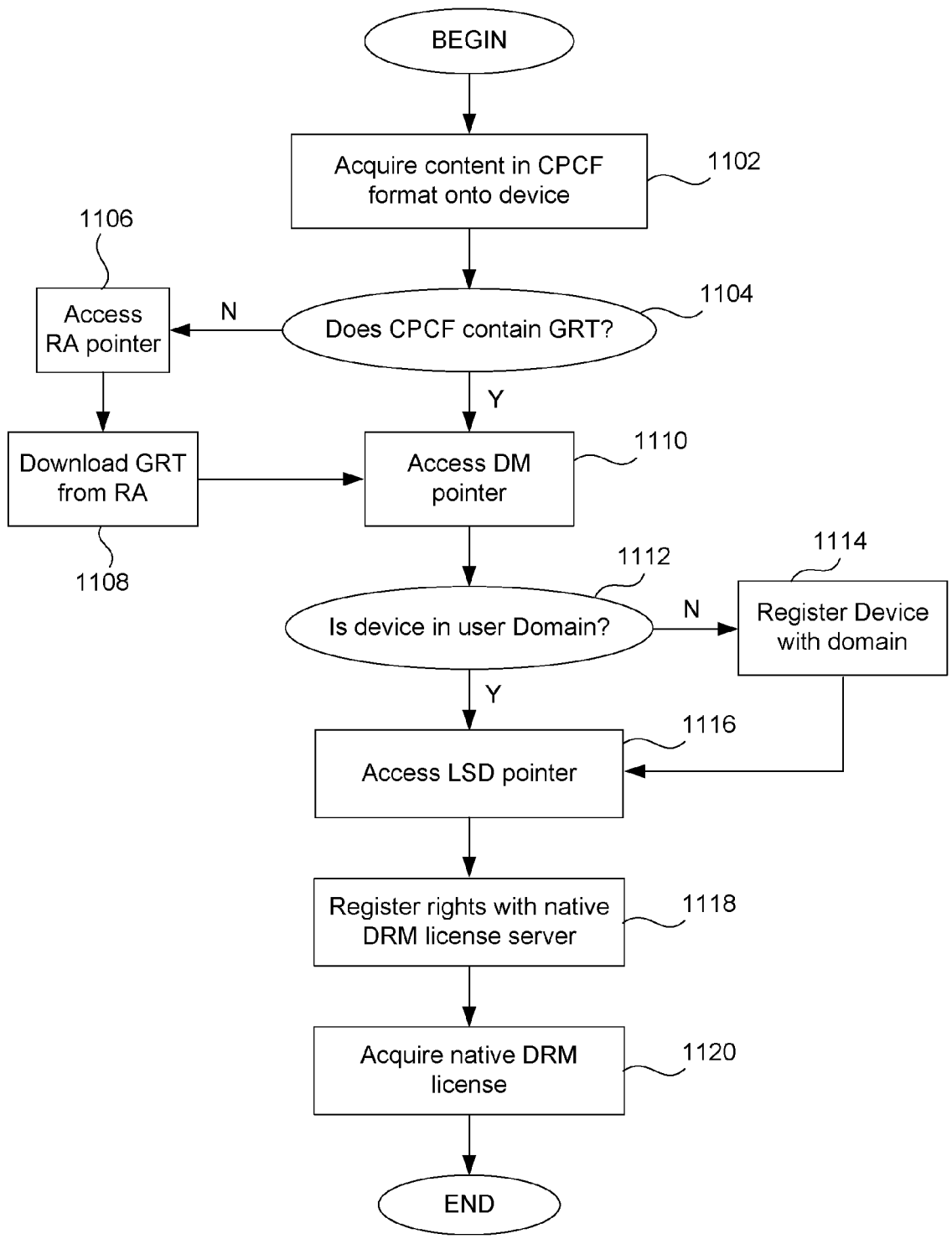
FIG. 11 is a flow diagram showing one embodiment of a process of downloading protected content and sharing the content in the multiple DRM interoperable architecture of the present invention.

FIG. 11 is a flow diagram showing one embodiment of a process of downloading protected content and sharing the content in the multiple DRM interoperable architecture of the present invention. At step 1102 a device acquires protected content in a CPCF file from a content provider. Once the CPCF file is on the device, the IDC checks whether the CPCF contains a GRT at step 1104. If the CPCF file does not have a GRT, the IDC or similar software on the device accesses the rights archive pointer in the file at step 1106. The pointer or URL is used to locate the rights archive server and the GRT is downloaded from the rights archive onto the device at step 1108. If the CPCF file contains the GRT, control goes directly to step 1110.

At step 1110 the IDC accesses the domain manager pointer in the CPCF file. At step 1112 it is determined whether the device is in the user's domain by examining data in the domain manager server. If it is not, the device is registered at step 1114 so that it now belongs in the domain. If it is determined at step 1112 that the device is registered, control goes to step 1116 where the license server directory pointer in the CPCF file is accessed by the IDC. At step 1118 the rights associated with the protected content and the device are registered with a native DRM license server. At step 1120 the device acquires a native DRM license to render the protected content on the device and the process is complete.

In one embodiment, the methods and processes described may be implemented as computer program instructions and employed to implement the systems described herein. As such, particular embodiments may relate to machine-readable media that include program instructions, state information, and the like for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For example, although the license server directory, rights archive, and domain manager network services are shown separately, they may all execute from one network component under control of the third-party service provider or consortium of content providers. The locations of these services may also be contained at the content providers or at a mutually beneficial location. Accordingly, the embodiments described are to be considered as illustrative and not restrictive, and the invention is not to be limited to the details given herein, but may be modified within the scope and equivalents of the appended claims.

We claim:

1. A method of rendering content at least on a first device having a first native digital rights management (DRM) system and on a second device having a second native DRM system, the method comprising:
   acquiring the content on the first device and on the second device in a common content format file comprising a domain manager pointer to a domain manager, a rights archive pointer to a rights archive, and a license server directory pointer to a license server directory;
   determining whether the first device and the second device are registered in the same domain by accessing the domain manager utilizing the domain manager pointer in the common content format file;
   accessing the license server directory comprising a memory device maintaining one or more native license server identifiers, wherein the license server directory is access utilizing the license server directory pointer in the common content format file;
   transmitting a first domain identifier, a second domain identifier, a first device identifier and a second device identifier to the license server directory;
   obtaining from the license server directory a native license server identifier for the content; and
   receiving at the first device and at the second device a native DRM system trigger from a native license server associated with the native license server identifier, wherein the native DRM system trigger is transmitted if the native license server determines that each device has a license to render the content, thereby enabling rendering of the content in the common content format file on the first device and on the second device using a first native DRM system client software module on the first device and a second native DRM system client software module one the second device; and
   wherein the first native DRM system and the second native DRM system are components in an interoperable, multiple-DRM system, the first native DRM system being different from the second native DRM system.

2. The method as recited in claim 1 further comprising obtaining a generic rights token by accessing the rights archive utilizing the rights archive pointer in the common content format file.

3. The method as recited in claim 1 further comprising executing an interoperable domain client on the first device and on the second device, the interoperable domain client performing operations on the common content format file.

4. The method as recited in claim 1 wherein receiving a native DRM system trigger further comprises invoking a native DRM system client software module one the first device and on the second device.

5. The method as recited in claim 1 further comprising determining whether the content may be shared by the first device and by the second device in the same domain.

6. The method as recited in claim 2, further comprising:
   locating the domain manage pointer, the rights archive pointer, the license server directory pointer, the generic rights token and the content in standardized locations in the common content format file, wherein said standardized location in the common content format comprise a shared discrete headers area that includes a common headers storage area for maintaining pointers to multiple network services for enabling interoperability.

7. The method as recited in claim 1, wherein:
a DRM header of one DRM system of said multiple-DRM system is incompatible with a DRM header of another DRM system of said multiple-DRM system.

8. A non-transitory computer-readable medium having instructions which when executed on a computer perform a method of rendering content at least on a first device having a first native digital rights management (DRM) system and on a second device having a second native DRM system, the method comprising:
acquiring the content on the first device and on the second device in a common content format file comprising a domain manager pointer to a domain manager, a rights archive pointer to a rights archive, and a license server directory pointer to a license server directory;
determining whether the first device and the second device are registered in the same domain by accessing the domain manager utilizing the domain manager pointer in the common content format file;
accessing the license server directory utilizing the license server directory pointer in the common content format file;
transmitting a first domain identifier, a second domain identifier, a first device identifier and a second device identifier to the license server directory;
obtaining from the license server directory a native license server identifier for the content;
receiving at the first device and at the second device a native DRM system trigger from a native license server associated with the native license server identifier;
wherein the native DRM system trigger is transmitted if the native license server determines that each device has a license to render the content, thereby enabling rendering of the acquired content in the common content format file on the first device and on the second device using a native DRM system client software module on the first device and on the second device; and
wherein the first native DRM system the second native DRM system are components in an interoperable, multiple-DRM system, the first native DRM system being different from the second native DRM system.

9. A system for rendering content at least on a first device having a first native digital rights management (DRM) system and on a second device having a second native DRM system, the system comprising:
a license server directory; and
a content rendering device configured to:
acquire content on the first device having the first native DRM system and on the second device having the second native DRM system, wherein the content is acquired in a common content format file comprising a domain manager pointer to a domain manager, a rights archive pointer to a rights archive, and a license server directory pointer to the license server directory;
determine whether the first device and the second device are registered in the same domain by accessing the domain manager utilizing the domain manager pointer in the common content format file;
access the license server directory utilizing the license server directory pointer in the common content format file;
transmit a first domain identifier, a second domain identifier, a first device identifier and a second device identifier to the license server directory;
obtain from the license server directory a native license server identifier for the content;
wherein the first device and the second device each receive a native DRM system trigger from a native license server associated with the native license server identifier, wherein the native DRM system trigger is transmitted if the native license server determines that each device has a license to render the content, thereby enabling rendering of the content in the common content format file on the first device and on the second device using a first native DRM system client software module on the first device and a second native DRM system client software module on the second device; and
wherein the first native DRM system the second native DRM system are components in an interoperable, multiple-DRM system, the first native DRM system being different from the second native DRM system.

10. The system of claim 9, wherein the content rendering device is further configured to:
obtain a generic rights token by accessing the rights archive utilizing the rights archive pointer in the common content format file.

11. The system of claim 9, wherein the content rendering device is further configured to:
execute an interoperable domain client on the first device and on the second device, the interoperable domain client programing operations on the common content format file.

12. The system of claim 9, wherein receiving the native DRM system trigger invokes at least a native DRM system client software module each on the first device and on the second device.

13. The system of claim 9, wherein the content rendering device is further configured to:
determine whether the content may be shared by the first device and by the second device in the same domain.

14. The system of claim 10, wherein:
the domain manager pointer, the rights archive pointer, the license server directory pointer, the generic rights token and the content are in standardized location in the common content format file; and
said standardized location in the common content format file comprise a shared discrete headers area that includes a common headers storage area for maintaining pointers to multiple network services for enabling interoperability.

15. The system of claim 9, wherein:
a DRM header of one DRM system of said multiple-DRM system incompatible with a DRM header of another DRM system of said multiple-DRM system.

* * * * *